(12) United States Patent
Hudnut et al.

(10) Patent No.: US 8,229,161 B2
(45) Date of Patent: *Jul. 24, 2012

(54) VISION-ENABLED HOUSEHOLD APPLIANCES

(75) Inventors: Alec Hudnut, Los Angeles, CA (US); William Gross, Pasadena, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,779

(22) Filed: Mar. 4, 2011

(65) Prior Publication Data

US 2011/0268311 A1 Nov. 3, 2011

Related U.S. Application Data

(63) Continuation of application No. 11/038,714, filed on Jan. 20, 2005, now Pat. No. 7,903,838.

(60) Provisional application No. 60/540,905, filed on Jan. 30, 2004.

(51) Int. Cl.
*G06K 9/00* (2006.01)
(52) U.S. Cl. .......... 382/100; 382/181; 382/325
(58) Field of Classification Search .......... 382/100, 382/103, 110, 115, 124, 141, 143, 181, 153, 382/231, 325
See application file for complete search history.

(56) References Cited

U.S. PATENT DOCUMENTS 6,175,772 B1 * 1/2001 Kamiya et al. .......... 700/31

* cited by examiner

*Primary Examiner* — Brian Q Le
*Assistant Examiner* — Edward Park
(74) *Attorney, Agent, or Firm* — Andrew S. Naglestad

(57) ABSTRACT

The invention is generally related to the systems and methods through which household appliances can provide intuitive and enhanced interactivity through visual inputs. In particular, the disclosure presents methods relating to control of a household appliance, such as a microwave or a refrigerator, via recognition of visual indicia, such as graphics, text, and the like, using a visual sensor such as a camera.

3 Claims, 2 Drawing Sheets

VISION-ENABLED HOUSEHOLD APPLIANCES

CROSS-REFERENCE TO RELATED APPLICATIONS

This is a continuation of U.S. patent application Ser. No. 11/038,714 filed Jan. 20, 2005 now U.S. Pat. No. 7,903,838, which claims the benefit under 35 U.S.C. §119(e) of U.S. Provisional Application No. 60/540,905, filed Jan. 30, 2004, the entireties of which are hereby incorporated by reference.

BACKGROUND OF THE INVENTION

1. Field of the Invention

This invention generally relates to the methods through which household appliances can provide intuitive and enhanced interactivity through visual inputs. In particular, the disclosure presents methods relating to control of a household appliance, such as a microwave or a refrigerator, via recognition of visual indicia, such as graphics, text, and the like, using a visual sensor such as a camera.

2. Description of the Related Art

In a typical household environment, consumers interact with a variety of household appliances. Generally, consumers interact with household appliances and provide inputs to the appliances by touching the appliances. For example, a user of a microwave generally sets the mode of the microwave's operation, such as the time and power of the microwave's operation, through the use of a keypad located on the microwave. By way of further example, a user of a washing machine generally sets the mode of the washing machine's operation, such as the time and temperature of the wash, through the use of dials, levers, knobs, and the like located on the washing machine.

Recently, consumers have become able to control household appliances through other input methods. For example, an Internet-enabled washing machine, such as the washing machine from LG Electronics of South Korea, see Williams, Martyn, *Surf Among Suds With Web-Enabled Washing Machine*, [online], [retrieved on 2004-01-29], retrieved from the Internet <URL: http://www.pcworld.com/news/article/0,aid,32128,00.asp>, can receive operating instructions from an Internet web site, instead of, or in addition to manual input from the user. As another example, the SeasonPass™ service offered by TiVo, Inc., [online], [retrieved on 2004-01-29], retrieved from the Internet <URL: http://www.tivo.com/1.3.1.asp>, can retrieve television programming schedules from an Internet web site or other remote source, instead of, or in addition to receiving operating instructions via manual input from the user.

SUMMARY OF THE INVENTION

Embodiments described herein include methods for controlling and automating household appliances via a camera or other imaging device that is coupled to the appliance. Objects in the environment, such as household objects commonly found in household environments, which include food and drink containers, dishes, utensils, clothing, and the like, can be placed in the field of view of the camera or other imaging device. Indicia on the objects can be recognized and associated with one or more instructions, commands, or actions to be performed by the household appliance.

BRIEF DESCRIPTION OF THE DRAWINGS

These and other features of the invention will now be described with reference to the drawings summarized below. These drawings (not to scale) and the associated descriptions are provided to illustrate preferred embodiments of the invention and and not intended to limit the scope of the invention.

DETAILED DESCRIPTION OF PREFERRED EMBODIMENTS

Although this method will be described in terms of certain preferred embodiments, other embodiments that are apparent to those of ordinary skill in the art, including embodiments that do not provide all of the benefits and features set forth herein, are also within the scope of the method.

Embodiments of the method include methods for controlling and automating household appliances via a camera or other imaging device that is coupled to the appliance. Advantageously, objects in the environment, such objects commonly found in households, can be placed within the field of view of the camera, a visual sensor or other imaging device. Indicia on the objects can be recognized and associated with one or more instructions, commands, or actions to be performed by the appliance.

Figure 2:
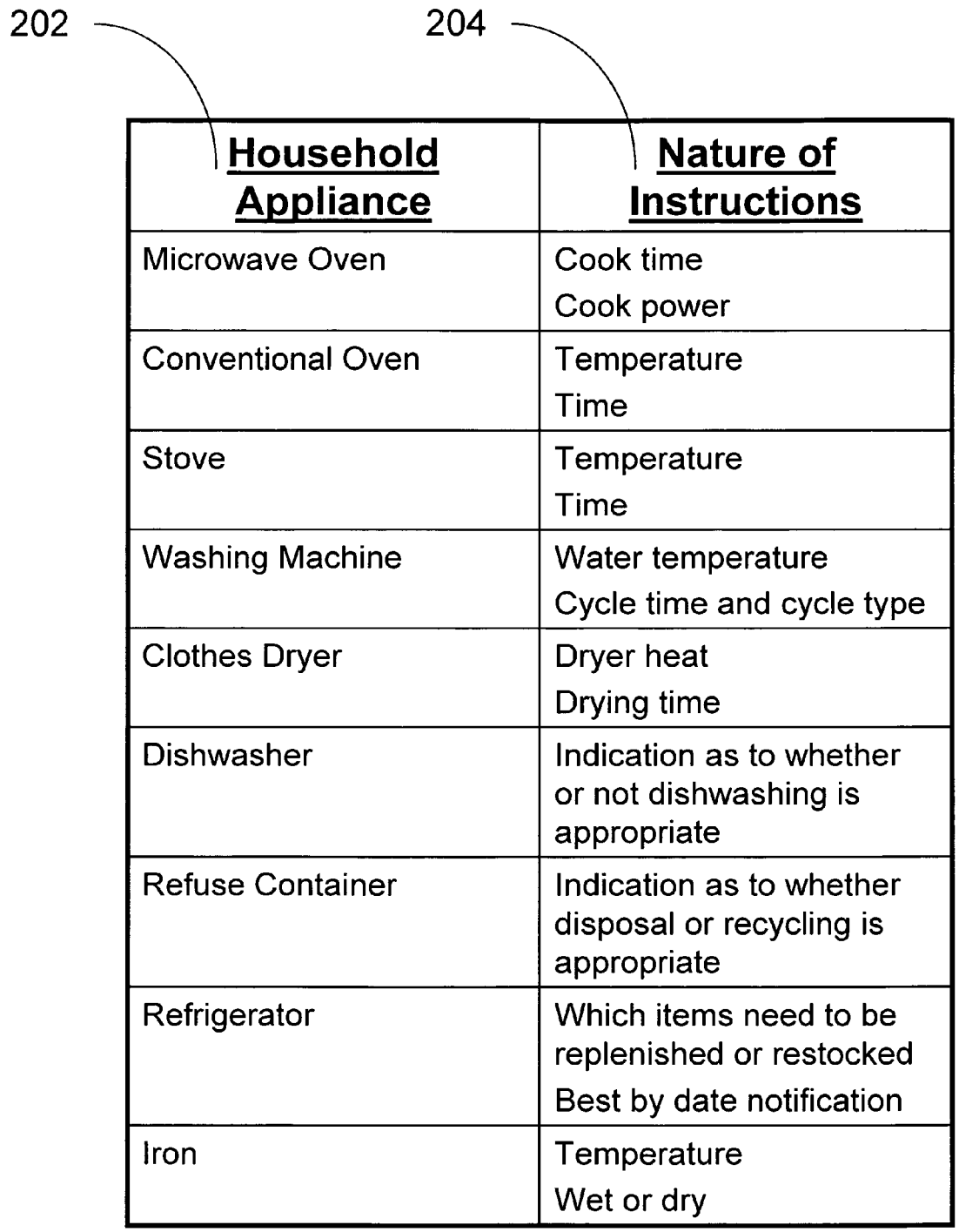
FIG. 2 illustrates household appliances and associated actions, instructions to perform household duties.

Examples of embodiments will now be described. Although embodiments of the method will be described in the context of selected appliances, it will be understood by one of ordinary skill in the art that the principles and advantages described herein will also be applicable to a broad variety of appliances. Example household appliances and associated actions and instructions are shown in FIG. 2. For example, a household appliance 202 can correspond to one of a microwave oven, a conventional oven, a stove, a washing machine, a clothes dryer, a dishwasher, a refuse container, a refrigerator, and an iron. It will be understood that the term "appliance" does not include automated machines typically found in an office, retail, or industrial environment, such as a copy machine, a mail sorting machine, and a hand-held barcode scanner, and does not include audiovisual entertainment devices such as a VCR, a television, a radio, and a DVD player. One or more example instructions or operational parameters 204 are associated with each appliance 202 through a visually-based automation process. It will be understood that the instructions associated with each appliance depend on the nature and the model of the appliance, and the operational parameters associated with a particular appliance may contain parameters that are not shown in FIG. 2. Additionally, it will be understood that when more than one operational parameter is associated with an appliance, an embodiment that addresses some, but not all, of the operational parameters is still within the scope of the method contemplated herein.

The appliances described may include single-processor or multiprocessor embedded systems. Additionally, these appliances include an addressable storage medium or computer accessible medium, such as random access memory (RAM), an electronically erasable programmable read-only memory (EEPROM), flash memory, hard disks, floppy disks, laser disk players, Compact Disc ROMs, DVD-ROMs, video tapes, audio tapes, magnetic recording tracks, electronic networks, and other techniques to transmit or store electronic content such as, by way of example, programs and data. In one embodiment, the appliances are equipped with a network communication device such as a network interface card, a modem, infra-red (IR) port, or other network connection device suitable for connecting to a network. Furthermore, the appliances may execute an appropriate operating system such as Linux, Unix, VxWorks®, QNX® Neutrino®, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, IBM® OS/2®, Microsoft® Windows® CE, or Palm OS®. In another embodiment, the method is implemented in a dedicated controller or processor, where no operating system is used. As is conventional, the appropriate operating system may advantageously include a communications protocol implementation, which handles incoming and outgoing message traffic passed over the network. In other embodiments, while the operating system may differ depending on the type of appliance, the operating system may continue to provide the appropriate communications protocols necessary to establish communication links with the network.

In one embodiment, the user can train or program the appliance's recognition system on sets of indicia that correspond to previously identified household objects and associate an object with appropriate operating instructions such that when the object is presented to the appliance's imager at a later time, the appliance can recognize the object and retrieve and/or perform the associated operating instructions. The selection of the sets of indicia that correspond to selected objects in the recognition in training or programming a recognition system can be accomplished, for example, through selecting and storing one or more visual measurement representation, such as features corresponding shape, color, size and graphical representation of common household objects. Alternatively, a fair representation of the pixel information associated with object images can be stored in a recognition database for training purpose. The training information can be used by the appliances later to match with visual images received to initiate a series of actions automatically. FIG. 2 shows exemplary natures of instructions 204 of household appliances associated with the corresponding household appliances 202.

The visual sensor can correspond to a digital camera with a CCD imager, a CMOS imager, an infrared imager, and the like. The visual sensor can include normal lenses or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. Another example of a visual sensor is an optical scanner, such as a bar-code scanner, that uses a laser to scan.

DETAILED DESCRIPTIONS OF DRAWINGS

Figure 1:
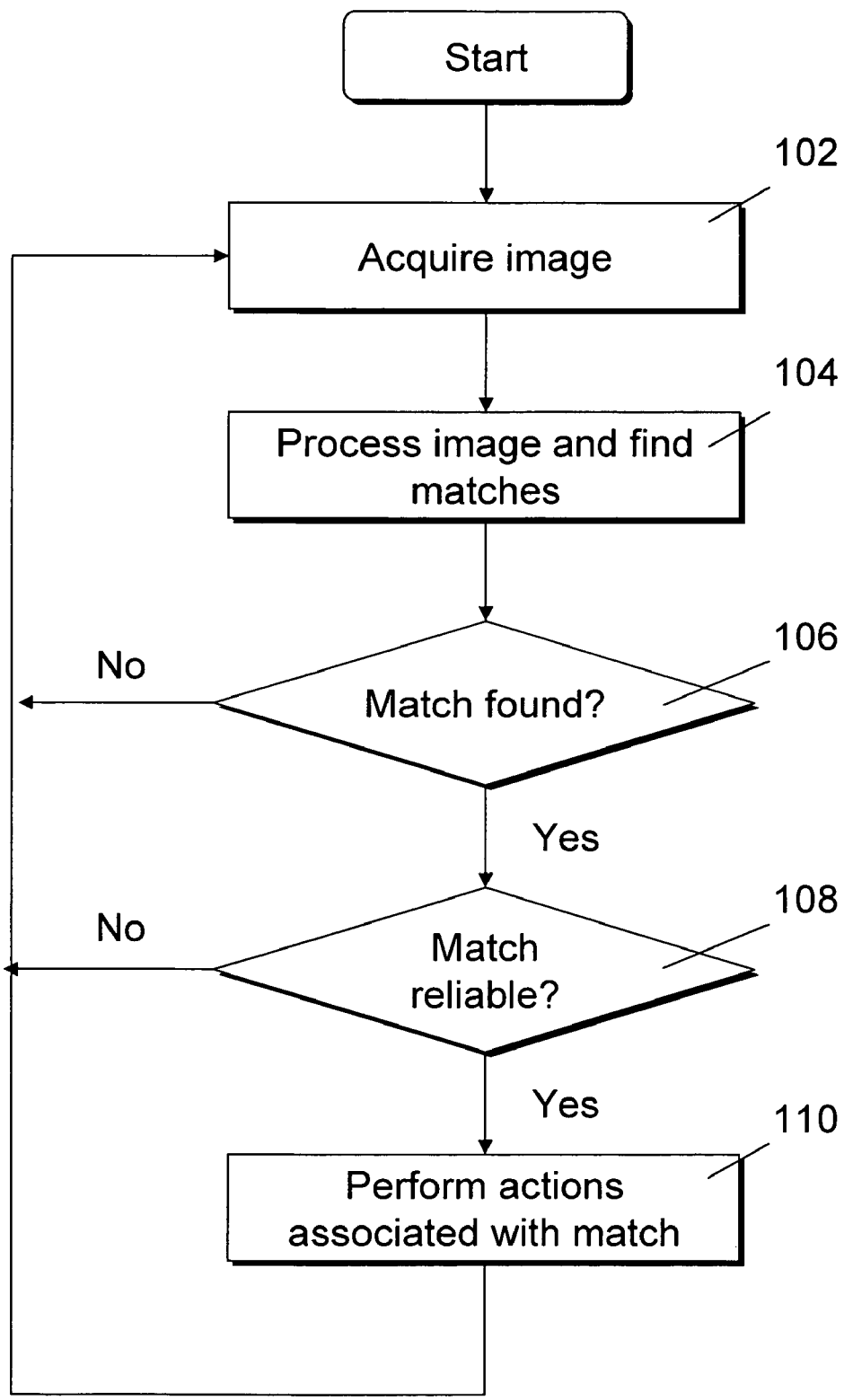
FIG. 1 is a flowchart that generally illustrates a process useful for controlling a household appliance through the use of visual inputs.

FIG. 1 is a flowchart that generally illustrates a visually-based automated process for controlling and automating an appliance through the use of visual inputs. It will be appreciated by the skilled practitioner that the illustrated process can be modified in a variety of ways without departing from the spirit and scope of the method. For example, in another embodiment, various portions of the illustrated process can be combined, can be rearranged in an alternate sequence, can be removed, and the like.

At the start of the process, the appliance has already been trained or programmed to recognize previously identified household objects and associate operating instructions with the recognized objects.

The process begins in a state 102. In the state 102, the process receives or monitors visual data from a visual sensor, such as data from a camera. The visual sensor can also correspond to an optical scanner, such as a barcode scanner. Advantageously, such visual sensors are relatively inexpensive. The process advances from the state 102 to a state 104.

In the state 104, the process analyzes the visual data acquired in the state 102 for recognition of indicia. A variety of visual recognition techniques can be used, and it will be understood by one of ordinary skill in the art that an appropriate visual recognition technique can depend on a variety of factors, such as the visual sensor used and/or the visual indicia used. In one example, the indicia are identified using an object recognition process that can identify visual features. In one example, the visual features correspond to scale-invariant (SIFT) features. The concept of SIFT has been extensively described in the literature. See David G. Lowe, *Object Recognition from Local Scale-Invariant Features*, Proceedings of the International Conference on Computer Vision, Corfu, Greece (September 1999) and David G. Lowe, *Local Feature View Clustering for 3D Object Recognition*, Proceedings of the IEEE Conference on Computer Vision and Pattern Recognition, Kauai, Hawaii (December 2001). In another example, the indicia are identified by reading a printed code, such as a bar code or a colored bar code. In yet another example, the indicia are identified by recognizing a color or a range of colors.

The identified indicia are compared to indicia stored in a database that are recognized by the system. In one embodiment, the database that contains indicia that can be recognized is contained within the system. In another embodiment, the database that contains indicia that can be recognized is not contained within the system and can instead be accessed remotely, over a network such as the Internet. The process may find one match, may find multiple matches, or may find no matches. Optionally, if the process finds multiple matches, it can, based on one or measures of the quality of the matches, designate one match, such as the match with the highest value of an associated quality measure, as the best match.

It will be understood that such a process can be embodied in a dedicated hardware circuit. Other appropriate techniques will be readily determined by one of ordinary skill in the art. The process advances from the state 104 to a decision block 106.

In the decision block 106, a determination is made as to whether the process found one or more matches in the state 104. If the process does not identify any matches in the state 104, the process returns to the state 102 to acquire another image. If the process identifies one or more matches in the state 104, the process proceeds to a decision block 108. The process finds a match when at least one feature in a received image match with at least one feature from a previously identified household object in the training or program phase of the appliance. The process, in a preferred embodiment, is a visually-based automated process. The criteria use in the decision block 106 can be a predetermined measurement for a measure of a quality. In one embodiment of this invention, the measurement can be associated with the number of matched features between the previously identified household object and the visual image received by the sensor. Two states can be set up for a measure of a quality for the measurement of quality. The first state can be associated with a higher match quality and the second state is associated a lower match quality. The measurement of quality is representative of a measure of a quality in either state. Additional quality metric can be used to represent the measurement of quality such as probability of identical match and the like.

In the decision block 108, a determination is made as to whether the match found in the decision block 108 is considered reliable. In one embodiment, when one or more matches are found, the system can optionally wait for one or more extra cycles to compare the matched object from these extra cycles, so that the system can more reliably determine the true object. In one implementation, the system requires that the matched object be identical for two or more cycles. Another implementation computes the statistical probability that each object that can be recognized is present over several cycles. In another embodiment, a match is considered reliable if the value of the associated quality measure exceeds a predetermined threshold. In another embodiment, a match is considered reliable if the number of identified indicia exceeds a predetermined threshold. In yet another embodiment, the identified match, or the best match if multiple matches have been identified, is always considered reliable. The analysis process of using a quality matrix such as the number of cycles for identical results, statistical probability, value of the associated quality measure or multiple matches can include other parameters to set a proper threshold of acceptable actions for an appliance depending on the degree of reliability desired. A two-state measurement metric can be use to filter the lower quality match from higher quality match before the process automates the appliance to execute an operating instruction.

If the decision block 108 determines that the match is not considered reliable, the process returns to the state 102 to acquire another image. If the process determines that the match is considered reliable, the process proceeds to a state 110.

In the state 110, the system performs one or more actions that are associated with the matched object. The action or actions can vary in a wide range. For example, the actions can correspond to commencing the appliance's operation in a particular mode, altering the appliance's operation, initiating a communication such as an e-mail message, playing a recorded sound, displaying a prompt that includes graphics and/or text on a screen, enunciating one or words or phrases using machine-generated speech, and the like.

The process then returns to the state 102 to acquire another image. In one embodiment, the system returns to the state 102 immediately after it has initiated the action in the state 110. In another embodiment, the system waits until the action initiated in the state 110 has been completed before returning to the state 102. In yet another embodiment, the system waits a pre-determined amount of time before returning to the state 102. Other appropriate modes of returning to the state 102 will be readily determined by one of ordinary skill in the art.

Example Modes of Operation

Example applications of the interaction method will now be described to further illustrate example system operations.

In one embodiment, the method can advantageously be used to simplify the operation of a microwave. For example, a user of a microwave can present a food container to an imaging system coupled to the microwave, and the microwave can recognize the container by identifying indicia present on the surface of the container. The microwave can then retrieve operating instructions, such as, for example, cook time and cook power, associated with the identified container. The microwave can display or enunciate the retrieved operating instructions to the user and can program itself with the retrieved operating instructions. The database that associates the recognized container with the operating instructions can be, by way of example, stored within the microwave or stored on a network, such as the Internet, and accessed by the microwave as necessary. Optionally, the user can train the microwave's recognition system on selected food containers and associate a food container with appropriate operating instructions such that when the food container is presented to the microwave's imager again, the microwave will recognize the food container and retrieve the associated operating instructions.

In another embodiment, the method can advantageously be used in a refuse container to sort refuse efficiently. For example, a user of the refuse container can present a piece of refuse to an imaging system coupled to the container, and the container can recognize the refuse by identifying indicia present on the surface of the refuse. The refuse container can then retrieve disposal instructions, such as, for example, an indication that the refuse should be recycled rather than discarded as trash. The refuse container can display or enunciate the disposal instructions to the user. The database that associates the recognized refuse with the disposal instructions can be, by way of example, stored within the refuse container or stored on a network, such as the Internet, and accessed by the refuse container as necessary. Optionally, the user can train the refuse container's recognition system on selected refuse objects and associate a refuse object with appropriate disposal instructions such that when the refuse object is presented to the refuse container's imager again, the refuse container will recognize the refuse object and retrieve the associated disposal instructions.

In another embodiment, the method can advantageously be used to clean dishes, such as, for example, utensils, plates, drinking vessels, and the like, efficiently and safely. For example, a user of a dishwasher can present a dish to an imaging system coupled to the dishwasher, and the dishwasher can recognize the dish by identifying indicia present on the surface of the dish. The dishwasher can then retrieve cleaning instructions, such as, for example, an indication that the dish is not dishwasher-safe and should not be cleaned in the dishwasher. The dishwasher can display or enunciate the cleaning instructions to the user. The database that associates the recognized dish with the cleaning instructions can be, by way of example, stored within the dishwasher or stored on a network, such as the Internet, and accessed by the dishwasher as necessary. Optionally, the user can train the dishwasher's recognition system on selected dishes and associate a dish with appropriate cleaning instructions such that when the dish is presented to the dishwasher's imager again, the dishwasher will recognize the dish and retrieve the associated cleaning instructions.

In another embodiment, the method can advantageously be used to wash clothing efficiently and safely. For example, a user of a washing machine can present an article of clothing to an imaging system coupled to the washing machine, and the washing machine can recognize the article by identifying indicia present on the surface of the article or on a label attached to the article. The washing machine can then retrieve washing instructions, such as, for example, an indication that the article of clothing should be washed in cold water or an indication that the article of clothing should be washed only with articles of clothing of similar color. The washing machine can display or enunciate the washing instructions to the user. In another implementation, the washing machine can identify multiple sets of indicia, corresponding to multiple articles of clothing, in the same image and can retrieve washing instructions corresponding to the identified plurality of articles of clothing. By way of example, if the washing machine were to recognize the presence of a red article of clothing and a white article of clothing in the same image, the washing machine can act to enunciate a warning that should it be desired to wash the two identified articles of clothing together, the water temperature should be set to cold water, or the washing machine can automatically set the water temperature to a cold water setting. The database that associates the recognized article or articles of clothing with the washing instructions can be, by way of example, stored within the washing machine or stored on a network, such as the Internet, and accessed by the washing machine as necessary. Optionally, the user can train the washing machine's recognition system on selected articles of clothing and associate an article of clothing and/or combinations of articles of clothing with appropriate washing instructions, such that when the article or articles of clothing are presented to the washing machine's imager again, the washing machine will recognize the article or articles of clothing and retrieve the associated washing instructions.

In yet another embodiment, the invention enhance functionality of a refrigerator through the vision sensor and the method provide herein to inventory what remains in the refrigerator. The inventory can be advantageously displayed on a panel or screen in front of the refrigerator. The information on the screen can advise the household appliance owner of what is missing from the refrigerator. Furthermore, an owner of the automated refrigerator can generate a list of items from the display for shopping. In one preferred embodiment, the list so generated can be automatically sent for a refill order through a website for online grocery shopping for a refill order.

Thus, as described above, embodiments of the method enable users to interact with household appliances by employing familiar modes of interaction, such as visual interaction. Various embodiments of the method have been described above. Although this method has been described with reference to these specific embodiments, the descriptions are intended to be illustrative of the method and are not intended to be limiting. Various modifications and applications may occur to those skilled in the art without departing from the true spirit and scope of the method.

We claim:

1. An apparatus comprising:
    a household appliance configured to contact a physical object; wherein the household appliance comprises an enclosure configured to receive the physical object with which it is in contact;
    a camera for acquiring one or more images of the physical object; and
    a processor configured to:
        receive the one or more images;
        identify the object from the one or more images;
        retrieve one or more operational parameters associated with the identified object; and
        cause the household appliance to physically operate on the physical object while the physical object and appliance are in contact; wherein the appliance operates on the physical object in accordance with the one or more operational parameters associated with the object;
        wherein the household appliance alters a physical property of the physical object.

2. The apparatus of claim 1, wherein the household appliance is an oven and the physical property altered by the household appliance is object temperature.

3. The apparatus of claim 1, wherein the household appliance is a washing machine configured to apply water to the physical object, wherein the physical property altered by the household appliance includes object temperature and wetness.

* * * * *